United States Patent Office 3,262,825
Patented July 26, 1966

3,262,825

METHOD FOR ETCHING CRYSTALS OF GROUP III(a)-V(a) COMPOUNDS AND ETCHANT USED THEREFOR

Calvin S. Fuller, Chatham, N.J., assignor to Bell Telephone Laboratories, Incorporated, New York, N.Y., a corporation of New York No Drawing. Filed Dec. 29, 1961, Ser. No. 163,094
10 Claims. (Cl. 156—17)

This invention relates to a novel etchant which is capable of producing highly polished surfaces on Group III(a)–V(a) compounds.

More specifically, this invention is directed to an etchant comprising a mixture of acetic acid or methanol with a halogen selected from among chlorine, bromine and iodine, such etchant being particularly well suited as a substitute for or supplement to the usual mechanical polishing procedure for the materials discussed above.

In the fabrication of semiconductor devices it is essential to prepare the (semiconductor) starting material in slices which have flat, smooth, damage-free surfaces. This is particularly critical for diffused devices since imperfect surfaces disturb the even passage of the diffusant into the semiconductor slices. This, in turn, deleteriously affects the electrical characteristics of the device.

Several techniques such as electropolishing, chemical etching and mechanical lapping and polishing surfaces of semiconductor slices are well known and presently in use in the semiconductor art. By lapping and polishing techniques a surface can be prepared which is about 0.0001 inch per inch flat. The average roughness of this surface is typically 0.3 microinch. The resultant surfaces are smooth and flat enough for satisfactory device fabrication but the mechanical damage which is still present on the surface deleteriously affects the electrical characteristics of devices. Typically, it is necessary to remove such damaged surfaces prior to further processing by chemically etching the surfaces. Unfortunately, chemical etching with conventional etchants, such as aqua regia or mixtures of nitric and hydrofluoric acids, increases the average roughness of a typical surface to about 3.0 microinches or greater. Thus, the gain in removing mechanical damage by the chemical etching technique is obtained at the expense of increasing the average roughness. In order to obtain a surface which is sufficiently damage-free and still maintain a low average roughness and suitable flatness, these processes, namely, mechanical polishing and chemical etching, are alternated several times, so increasing production costs.

In accordance with this invention, an etchant is described which can be used effectively for group III(a)–V(a) compounds, particularly gallium arsenide and gallium phosphide, without the attendant problems discussed above. The novel etchant comprises an essentially non-aqueous mixture of an organic compound selected from among glacial acetic acid and methanol and a material selected from the group consisting of a halogen selected from among chlorine, bromine and iodine. The utilization of this mixture results in a surface which is substantially damage-free, and which evidences a low average roughness.

The novel etchants described herein are most effective in etching gallium arsenide and gallium phosphide although other group III(a)–V(a) compounds, such as indium antimonide may suitably be etched.

The basic ingredient of the etchant is an organic liquid selected from among methanol and glacial acetic acid, such liquids being employed in essentially anhydrous form since water adversely affects the rate of etching. The halogen component of the etchant is preferably selected from among chlorine, bromine and iodine; as well as mixtures of two or three, fluorine not being applicable due to practical limitations. The ultimate concentration of halogen in the organic solvent depends on the solubility. However, in order to obtain satisfactory etching rates it has been found advantageous to employ solutions containing at least 2 milligrams of the halogen per cubic centimeter of solution and up to and including saturated solutions. Although it will be recognized by those skilled in the art that less than this quantity of halogen may be employed when it is convenient to etch at slow rates, for example, quantities of halogen ranging down to 0.1 milligram per cubic centimeter of solution, practical considerations dictate an increased lower limit.

Alternatively, the chlorinated methanes, for example, mono, di, tri and tetra chloromethane, may be substituted for or added to the methanol or glacial acetic acid. If desired, variations in etching rate may be obtained by adding benzene or toluene to the methanol or acetic acid together with one or more of the halogens discussed above.

The etching technique for any of the compositions herein is generally conducted at room temperature although increasing the temperature appreciably accelerates the rate of etching. Conversely, decreasing temperature results in decreasing etching rate.

It is advantageous to perform the etching process by immersing the specimens to be polished in a bath containing a mixture of the organic liquid and a halogen, such mixture being contained in a suitable beaker. In the case of chlorine, due to its gaseous nature at room temperature, it is introduced into the organic liquid by bubbling through the liquid. Agitation assists in producing a more uniform etch.

The use of an organic solution as opposed to an aqueous etchant further permits the use of materials as resists which are water soluble, such as animal glue, gelatin, dextrins, proteins, etc.

Further, the etchants disclosed herein can be used advantageously in conjunction with wax resists employed in conventional photoengraving techniques. More particularly, wax resists which are often employed in techniques for photoengraving semiconductors are often etched by conventional prior art etchants so resulting in substantial undercutting of the semiconductor. The etchants described herein have been found to result in less undercutting as compared with prior art etchants in such applications.

Examples of the application of the present invention are set forth below. They are intended merely as illustrations and it is to be appreciated that the methods described may be varied by one skilled in the art without departing from the spirit and scope of the present invention.

EXAMPLE I

A 1-millimeter slice of p-type gallium arsenide crystal produced by the floating zone technique was ground to an even surface by means of #400 Aloxite paper using water as a grinding medium. After drying, it was immersed in a solution of bromine in methanol at room temperature (approximately 25° C.). The etching solution contained 5 $cm.^3$ of bromine to 10 $cm.^3$ of methanol. After one minute, it was found that the slice had been reduced to 0.7 mm. thickness and was highly polished. The surfaces were found suitable for the diffusion of thin n-type layers, such as from sulfur.

EXAMPLE II

A 1-millimeter slice of p-type gallium arsenide obtained as in Example I was etched at room temperature in a solution of 5 $cm.^3$ of bromine in 25 $cm.^3$ of methanol. A high polish was obtained on both faces of the slice and a decrease in thickness of 0.09 mm. was observed in one minute, so illustrating the reduction in etching rate with higher dilution.

EXAMPLE III

The procedure of Example II was repeated in a solution of 5 $cm.^3$ of bromine in 50 $cm.^3$ of methanol. A high polish was achieved in three minutes, the rate of etching being 0.08 mm. per minute, such solutions being acceptable for the preparation of surfaces suitable for device applications.

EXAMPLE IV

A slice of gallium arsenide crystal obtained by zone refining techniques was cut parallel to the (111) face and etched in a solution of 75 cm.3 nitric acid (conc.), 15 $cm.^3$ of hydrofluoric acid and 0.6 $cm.^3$ of bromine. After two minutes, the slice was removed and the arsenic face was found to be smooth and highly polished whereas the gallium face was rough, although bright. The slice was resurfaced by grinding and etched with a methanol solution saturated with chlorine, so producing two faces of equal smoothness.

For comparative purposes another slice of gallium arsenide was initially etched in the chlorine saturated methanol solution, so resulting in a crystal having faces of equal smoothness, thereby illustrating the greater polishing action of the methanol etch as compared with a typical prior art etchant.

EXAMPLE V

A 1-millimeter thick slice of gallium arsenide crystal obtained by zone refining techniques was etched in a solution composed of 2 $cm.^3$ of bromine, 5 $cm.^3$ of methanol and 5 $cm.^3$ of toluene. In two minutes 0.04 mm. thickness was removed and the surface had a matte appearance. A similar solution containing 2 $cm.^3$ of bromine, 4 $cm.^3$ of toluene and 10 $cm.^3$ of methanol removed gallium arsenide at the rate of 0.02 mm. per minute.

EXAMPLE VI

A crystal of gallium phosphide prepared by the floating-zone method was ground as described in Example I and after drying inserted into a beaker containing 5 $cm.^3$ of bromine in 5 $cm.^3$ of methanol maintained at 25° C. After six minutes the crystal thickness was decreased by 0.01 mm. producing a surface which was matte in appearance. Increasing the temperature to 50° C. increased the etch rate to 0.01 mm. in two minutes and a better polish was obtained. A stronger etch containing 5 $cm.^3$ of bromine in 10 $cm.^3$ of methanol removed 0.015 mm. in two minutes at 25° C.

EXAMPLE VII

A gallium phosphide slice was placed in a solution of chlorine in methanol maintained at 25° C., such solution having been prepared by bubbling the gas slowly through the alcohol at room temperature until nearly saturated (10 mg. of chlorine per $cm.^3$ of alcohol). In five minutes 0.06 mm. thickness was removed and the surfaces were bright and highly polished.

EXAMPLE VIII

The procedure of Example VII was repeated employing a slice of gallium arsenide. In three minutes 0.04 mm. of thickness was removed and the slice manifested a bright mirror-like surface.

EXAMPLE IX

An etchant composed of 1 gram of iodine in 10 $cm.^3$ of methanol was used to polish a slice of gallium arsenide having been ground to an even surface by means of #400 Aloxite paper using water as a grinding medium. Approximately thirty minutes was required at room temperature to remove 0.02 mm. thickness. Substitution of glacial acetic acid for the methanol resulted in similar etching whereas increasing the etching temperature to 50° C. doubled the etch rates in both cases.

EXAMPLE X

An etchant composed of 1 gram of iodine in 10 $cm.^3$ of methanol was employed at room temperature to etch a crystal of indium-antimonide and in two minutes 0.04 mm. thickness was removed, resulting in bright, mirror-like surface.

An analysis of the examples set forth above reveals that the use of methanol or acetic acid solutions of iodine, bromine and chlorine as etchants for the group III(a)–V(a) semiconductors results in a smooth, highly polished surface and the rate of etching increases for a given concentration of solution from iodine to chlorine. This rate also increases for a given etchant as one goes from III(a)–V(a) compounds near the top to those at the bottom of the Periodic Table. Thus, indium-antimonide polishes as well in iodine alcohol solutions as gallium-phosphide does in chlorine-alcohol solutions or as gallium arsenide does in bromine-alcohol solutions.

The novel etchants disclosed herein are also effective for removing thin diffusion layers in a precisely controllable manner as illustrated by the following example:

EXAMPLE XI

A slice of gallium phosphide weighing approximately 0.05 gram obtained by zone refining techniques was ground to flat surfaces by means of #400 Aloxite paper using no water. The specimen was next etched in a solution of chlorine saturated methyl alcohol at 25° C. for two minutes to provide a smooth, defect-free surface. It was then diffused with radioactive $Zn^{65}$ at 1100° C. for 20.3 hours in accordance with conventional diffusion techniques, as for example, shown by "Nuclear and Radiochemistry" by G. Friedlander and J. W. Kennedy, John Wiley & Sons, New York (1955). After removing the excess zinc from the surface by means of boiling hydrochloric acid, the specimen was dissolved step-wise using the chlorine-saturated methanol etch in order to determine the diffusion profile. The table set forth below reveals the decrease in weight and corresponding change in counts per minute on successive etchings.

*Table*

| Etch | Total Weight (Grams) | Sample, Count/ Minute |
|---|---|---|
| 0 | .118035 | 7,350 |
| 1 | .117589 | 7,170 |
| 2 | .103225 | 5,094 |
| 3 | .099508 | 4,550 |
| 4 | .086907 | 2,910 |
| 5 | .081716 | 2,490 |
| 6 | .072162 | 1,469 |
| 7 | .070080 | 1,355 |
| 8 | .067025 | 1,161 |
| 9 | .043227 | 676 |
| 10 | .033312 | 241 |
| 11 | .027660 | 60 |

The change in concentration of zinc as a function of distance from the surface can be determined readily by dividing the count/minute by the weight. The uniform attack of the chlorine-methanol etch over the surface thus permits the determination of penetration curves.

While the invention has been described in detail in the foregoing description, the aforesaid is by way of illustration only and is not restrictive in character. The several modifications which will readily suggest themselves to persons skilled in the art, are all considered within the broad range of this invention, reference being had to the appended claims.

What is claimed is:

1. The method of etching crystals of a compound of the group III(a)–V(a) system of the Periodic Table which comprises wetting said crystals with a substantially anhydrous mixture consisting essentially of an organic liquid selected from the group consisting of glacial acetic acid, methanol and the chlorinated methanes, and a material selected from the group consisting of a halogen selected from among chlorine, bromine and iodine, the said halogen being present in an amount of at least 2 mg. per cm.$^3$ by volume of the total solution.

2. The method of claim 1 wherein said material consists essentially of chlorine.

3. The method of claim 2 wherein said chlorine is bubbled into said organic liquid until a saturated solution is obtained.

4. The method of claim 1 wherein said group III(a)–V(a) compound is gallium phosphide.

5. The method of claim 1 wherein said group III(a)–V(a) compound is gallium arsenide.

6. The method of claim 1 wherein said group III(a)–V(a) compound is indium antimonide.

7. The method of claim 1 wherein said anhydrous mixture consists essentially of bromine and glacial acetic acid.

8. The method of claim 1 wherein said anhydrous mixture contains benzene.

9. The method of claim 1 wherein said anhydrous mixture contains toluene.

10. An etchant consisting essentially of a substantially anhydrous mixture of an organic liquid selected from the group consisting of glacial acetic acid, methanol and the chlorinated methanes, and a material selected from the group consisting of a halogen selected from among chlorine, bromine and iodine, said halogen being present in an amount of at least 2 mg. per cm.$^3$ by volume of the total solution.

References Cited by the Examiner

UNITED STATES PATENTS

| | | | |
|---|---|---|---|
| 2,640,767 | 6/1953 | Easley et al. | 252—79.4 |
| 2,806,807 | 9/1957 | Armstrong | 156—17 |
| 2,827,367 | 3/1958 | Cox | 156—17 |
| 2,846,340 | 8/1958 | Jenny | 156—17 |
| 2,849,296 | 8/1958 | Certa | 156—17 |
| 2,927,011 | 3/1960 | Stead | 156—17 |
| 2,984,897 | 5/1961 | Godfrey | 156—17 |
| 3,031,363 | 4/1962 | Soper | 156—17 |
| 3,114,088 | 12/1963 | Abercrombie | 148—33 |
| 3,156,596 | 11/1964 | Sullivan | 156—17 |

HAROLD ANSHER, *Primary Examiner.*

ALEXANDER WYMAN, JACOB STEINBERG, *Examiners.*